(12) United States Patent
Terai et al.

(10) Patent No.: US 8,584,560 B2
(45) Date of Patent: Nov. 19, 2013

(54) MAIN SPINDLE DEVICE

(75) Inventors: Hiroshi Terai, Niigata (JP); Takao Tatemi, Niigata (JP); Hidenori Sato, Niigata (JP); Hiroaki Kazama, Niigata (JP)

(73) Assignee: Tsugami Corporation, Tokyo (JP)

( * ) Notice: Subject to any disclaimer, the term of this patent is extended or adjusted under 35 U.S.C. 154(b) by 5 days.

(21) Appl. No.: 12/066,385

(22) PCT Filed: Jun. 14, 2007

(86) PCT No.: PCT/JP2007/062020
§ 371 (c)(1),
(2), (4) Date: Mar. 10, 2008

(87) PCT Pub. No.: WO2008/050508
PCT Pub. Date: May 2, 2008

(65) Prior Publication Data
US 2010/0218652 A1    Sep. 2, 2010

(30) Foreign Application Priority Data

Oct. 26, 2006  (JP) ................................. 2006-291207

(51) Int. Cl.
*B23B 9/00*     (2006.01)
*B23B 13/00*    (2006.01)
*B23B 19/02*    (2006.01)
*B23Q 3/12*     (2006.01)

(52) U.S. Cl.
USPC ................. 82/146; 82/121; 82/124; 279/4.07

(58) Field of Classification Search
USPC ........... 82/121, 124, 125, 127, 146, 147, 150, 82/151, 155; 279/4.07, 4.08, 4.09, 43, 50, 279/51

See application file for complete search history.

(56) References Cited

U.S. PATENT DOCUMENTS 1,637,176 A  *  7/1927  Davis ............................ 470/177
2,278,264 A  *  3/1942  Hollengreen et al. .......... 82/147

(Continued)

FOREIGN PATENT DOCUMENTS

EP          999003 A2  *  5/2000  ............. B23B 13/02
EP         0 999 003    *  10/2000  ............. B23B 13/12

(Continued)

OTHER PUBLICATIONS

Notice of Reasons for Rejection mailed on Jan. 31, 2012 for Japanese Patent Application No. 2006-291207, with English Translation, 6 pages total.

(Continued)

*Primary Examiner* — Kenneth E Peterson
*Assistant Examiner* — Samuel A Davies
(74) *Attorney, Agent, or Firm* — Kilpatrick Townsend & Stockton LLP

(57) ABSTRACT

A main spindle device has a main spindle (1) having a hollow hole, and a chuck unit (10) for grasping a work (W). A pipe unit (71) is inserted into the hollow hole of the main spindle (1) and receives insertion of the work (W) to thereby prevent the work (W) from vibrating when rotated together with the rotation of the main spindle. A support unit (72) supports the pipe unit (71) at one end of the main spindle (1) such that the axial line of the pipe unit (71) coincides with the axial line of the main spindle (1) and such that one end of the pipe unit (71) projects from the one end of the main spindle (1) to be positioned inside the chuck unit (10).

3 Claims, 3 Drawing Sheets

(56) References Cited

U.S. PATENT DOCUMENTS

| | | | | |
|---|---|---|---|---|
| 2,362,812 | A * | 11/1944 | Fouchey | 82/150 |
| 2,545,852 | A * | 3/1951 | Kurzweil et al. | 82/148 |
| 2,798,396 | A * | 7/1957 | Lee | 82/150 |
| 3,361,433 | A * | 1/1968 | Holdridge | 279/4.04 |
| 3,434,730 | A * | 3/1969 | Smrekar | 279/4.09 |
| 3,752,019 | A * | 8/1973 | Kaneko | 82/142 |
| 3,835,649 | A * | 9/1974 | Le Testu | 60/560 |
| 3,933,061 | A * | 1/1976 | Link | 82/147 |
| 4,094,521 | A * | 6/1978 | Piotrowski | 279/4.09 |
| 4,422,653 | A * | 12/1983 | Piotrowski | 279/2.03 |
| 4,580,471 | A * | 4/1986 | Oyama et al. | 82/146 |
| 4,614,470 | A * | 9/1986 | Sato et al. | 409/230 |
| 4,690,415 | A * | 9/1987 | Holdridge | 279/4.09 |
| 4,762,050 | A * | 8/1988 | Marchand | 91/1 |
| 4,762,447 | A * | 8/1988 | Marantette | 409/131 |
| 4,790,699 | A * | 12/1988 | Ringel | 409/231 |
| 4,791,841 | A * | 12/1988 | Pruvot et al. | 82/147 |
| 5,111,562 | A * | 5/1992 | Burka | 29/37 R |
| 5,303,622 | A * | 4/1994 | Goda | 82/127 |
| 5,735,651 | A * | 4/1998 | Harroun | 409/233 |
| 5,855,377 | A * | 1/1999 | Murphy | 279/50 |
| 5,971,380 | A * | 10/1999 | Hebener | 269/20 |
| 6,139,028 | A * | 10/2000 | Kosho | 279/114 |
| 6,173,971 | B1 * | 1/2001 | Shen | 279/4.08 |
| 6,199,928 | B1 * | 3/2001 | Bilsing | 294/86.4 |
| 6,272,956 | B1 * | 8/2001 | Schuettel | 82/142 |
| 6,302,006 | B1 * | 10/2001 | Schroder | 82/147 |
| 6,557,860 | B1 * | 5/2003 | Allen et al. | 279/4.09 |
| 6,640,679 | B1 * | 11/2003 | Roberts, Jr. | 82/165 |
| 6,874,789 | B2 * | 4/2005 | Shedlov | 279/4.09 |
| 7,637,188 | B2 * | 12/2009 | Joo et al. | 82/124 |
| 2002/0053771 | A1 * | 5/2002 | Wu | 279/4.07 |
| 2010/0218652 | A1 * | 9/2010 | Terai et al. | 82/146 |

FOREIGN PATENT DOCUMENTS

| | | | | |
|---|---|---|---|---|
| EP | 0 999 003 A2 * | 10/2000 | | B23B 13/02 |
| JP | 58-120403 A | 7/1983 | | |
| JP | 03-026406 A | 2/1991 | | |
| JP | 6-33603 U | 5/1994 | | |
| JP | 2000343301 A | * 5/1999 | | B23B 13/02 |
| JP | 2000-167701 A | 6/2000 | | |
| JP | 2000167701 A | * 6/2000 | | B23B 13/12 |
| JP | 2000-254803 A | 9/2000 | | |
| JP | 2001-071246 A | 3/2001 | | |
| JP | 2002-144119 A | 5/2002 | | |
| JP | 2003-019608 A | 1/2003 | | |
| JP | 2004-130502 | * 4/2004 | | B23B 13/02 |
| JP | 2004-130502 A | 4/2004 | | |
| JP | 2005-319540 A | 11/2005 | | |
| WO | WO 2006/046629 A1 | 11/2005 | | |

OTHER PUBLICATIONS

Notification of Reasons for Rejection, dated Oct. 18, 2011 and English translation thereof.

* cited by examiner

MAIN SPINDLE DEVICE

BACKGROUND OF THE INVENTION

1. Field of the Invention

The present invention relates to a main spindle device which grasps a collet.

2. Description of the Related Art

As a method of clamping a collet, conventional main spindle devices have utilized a method that involves the use of a member called toggle or damper. In this method, such a toggle or a damper is used for drawing a collet so that the collet constricts in diameter, or for pushing the collet so that the collet is loosen in diameter to unclamp a work. These methods will hereinafter be called "toggle method".

Other than these, a method which utilizes the urging force of coned disc springs has also been proposed. This method will hereinafter be called "coned disc spring method". For example, Unexamined Japanese Patent Application KOKAI Publication No. 2005-319540 discloses a main spindle device for a machine tool, which is of a coned disc spring method type.

However, each of the methods described above has problems that (1) the device is hard to rotate at a high speed, (2) reduction of the device size is difficult, and (3) fine adjustment of the chuck clamping force is difficult.

The toggle method suffers from (1) the device being hard to rotate at a high speed, because the device includes portions that easily lose their fine balance. Further, why (2) size reduction is difficult is because the main spindle has to be provided externally with devices such as an air cylinder, etc. by an add-on manner, thereby having a large size totally. Furthermore, a thin-walled pipe or the like is generally at a risk of being crushed, if grasped by the toggle method. This proves that (3) fine adjustment of the chuck clamping force is difficult.

In the coned disc spring method, on the other hand, why (1) high speed rotation is difficult is because no coned disc springs are provided near the collet and some portions therearound get out of balance easily. Further, (2) size reduction is difficult, because the coned disc springs themselves need to have a relatively long size to achieve a sufficient spring force. The existence of a piston bearing also makes size reduction difficult. Further, as regards the problem (3), it is possible to weaken the chuck clamping force by reducing the number of coned disc springs. However, it is generally difficult to finely adjust the clamping force of the chuck.

The present invention was made in view of the above-described circumstance, and an object of the present invention is to provide a main spindle device which can be rotated at a high speed while preventing sways of a work. Another object of the present invention is to provide a main spindle device which can be reduced in size.

SUMMARY OF THE INVENTION

A main spindle device according to the present invention comprises: a main spindle (1) having a hollow hole; a chuck unit (10) connected to one end of the main spindle (1) for grasping a work (W); a pipe unit (71) inserted into the hollow hole of the main spindle and receiving insertion of the work (W) to thereby prevent the work from vibrating when rotated together with rotation of the main spindle; and a support unit (72) which supports the pipe unit (71) at the one end of the main spindle (1), such that an axial line of the pipe unit (71) coincides with an axial line of the main spindle (1), and such that one end of the pipe unit (71) projects from the one end of the main spindle (1) to be positioned inside the chuck unit (10).

The other end of the pipe unit (71) may project from the other end of the main spindle (1), and a work feeding port, from which the work (W) is fed, may exist at the other end of the pipe unit (71).

A main spindle device according to the present invention comprises: a main spindle (1) which rotates about its axial line as a center of rotation; and a chuck unit (10) connected to one end of the main spindle (1) for grasping a work (W), and the chuck unit (10) comprises: a collet (6) for grasping the work (W); a cylinder (3) which contains thereinside a piston (311, 321) which moves in a direction to grasp the work (W) or in a direction to release the work (W), upon receiving a pressure of a pressured fluid supplied through an interior of the main spindle (1); and a collet grasping member (5) which applies a force to the collet (6) to get a smaller diameter thereof, in response to a move of the piston (311, 321).

At least two or more pistons (311, 321) may be provided in the cylinder (3).

Outer shapes of the cylinder (3), the pistons (311, 321), and the collet grasping member (5), which are present on the axial line of the main spindle (1) so as to face the main spindle (1), may have a generally circular contour, and a center of the generally circular contour may coincide with a spindle center of the main spindle (1).

The cylinder (3) may be made of a material which contains aluminum.

The main spindle device may comprise a pressured fluid pressure adjuster (521) which adjusts the pressure of the pressured fluid to be supplied to the piston (311, 321).

As described above, according to the main spindle device of the present invention, occurrence of vibration of the work can be suppressed as much as possible. Hence, the work can be rotated at a high speed.

Further, the chuck unit, which comprises elements for grasping the collet, exists at one end of the main spindle. Hence, the size of the device on the whole can be reduced.

BRIEF DESCRIPTION OF THE DRAWINGS

These objects and other objects and advantages of the present invention will become more apparent upon reading of the following detailed description and the accompanying drawings in which.

Figure 1:
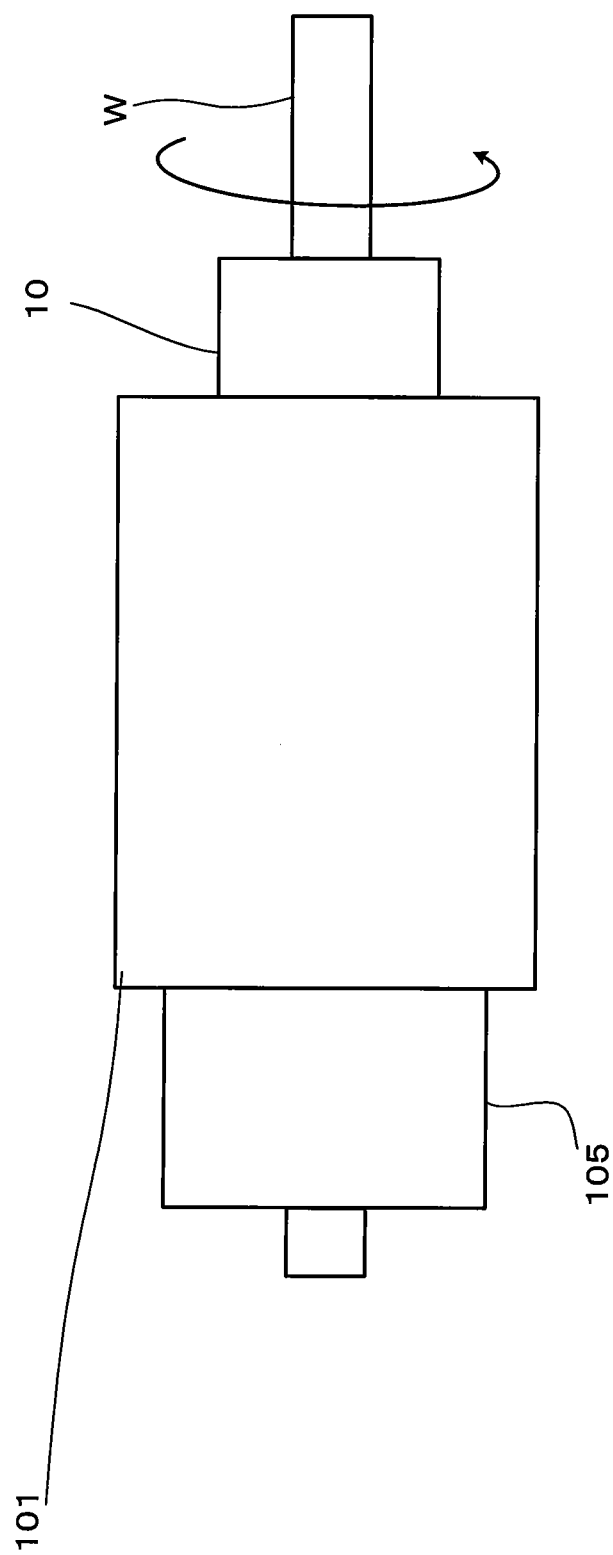
FIG. 1 is a plan view showing a main spindle device according to one embodiment of the present invention.

EXPLANATION OF REFERENCE NUMERAL 1 main spindle
2 flange
3 cylinder
4 cylindrical member
5 collet grasping member
6 collet
10 chuck unit
11 compressed air flow path
12 compressed air flow path
13 work feeding path
71 steady rest pipe 72 needle bearing
101 main housing
102 first bearing
103 second bearing
104 electric motor
105 sub housing
151 first bearing housing
152 second bearing housing
311 piston
321 piston
501 compressed air supply/discharge unit
502 compressed air circulating duct
503 compressed air circulating duct
521 air pressure reducing valve
522 air pressure reducing valve

DETAILED DESCRIPTION OF THE PREFERRED EMBODIMENT

An embodiment of the present invention will be explained below with reference to the drawings.

FIG. 1 is a plan view of a main spindle device of the present invention according to one embodiment. A main housing 101 has a chuck unit 10 for grasping a work W, at its one end on the right hand of the drawing. The work W is rotated by a work rotating motor (unillustrated) as indicated by an arrow in the drawing, to be subjected to a cutting operation, etc. The main housing 101 has a sub housing 105 provided at its other end on the left hand of the drawing.

Figure 2:
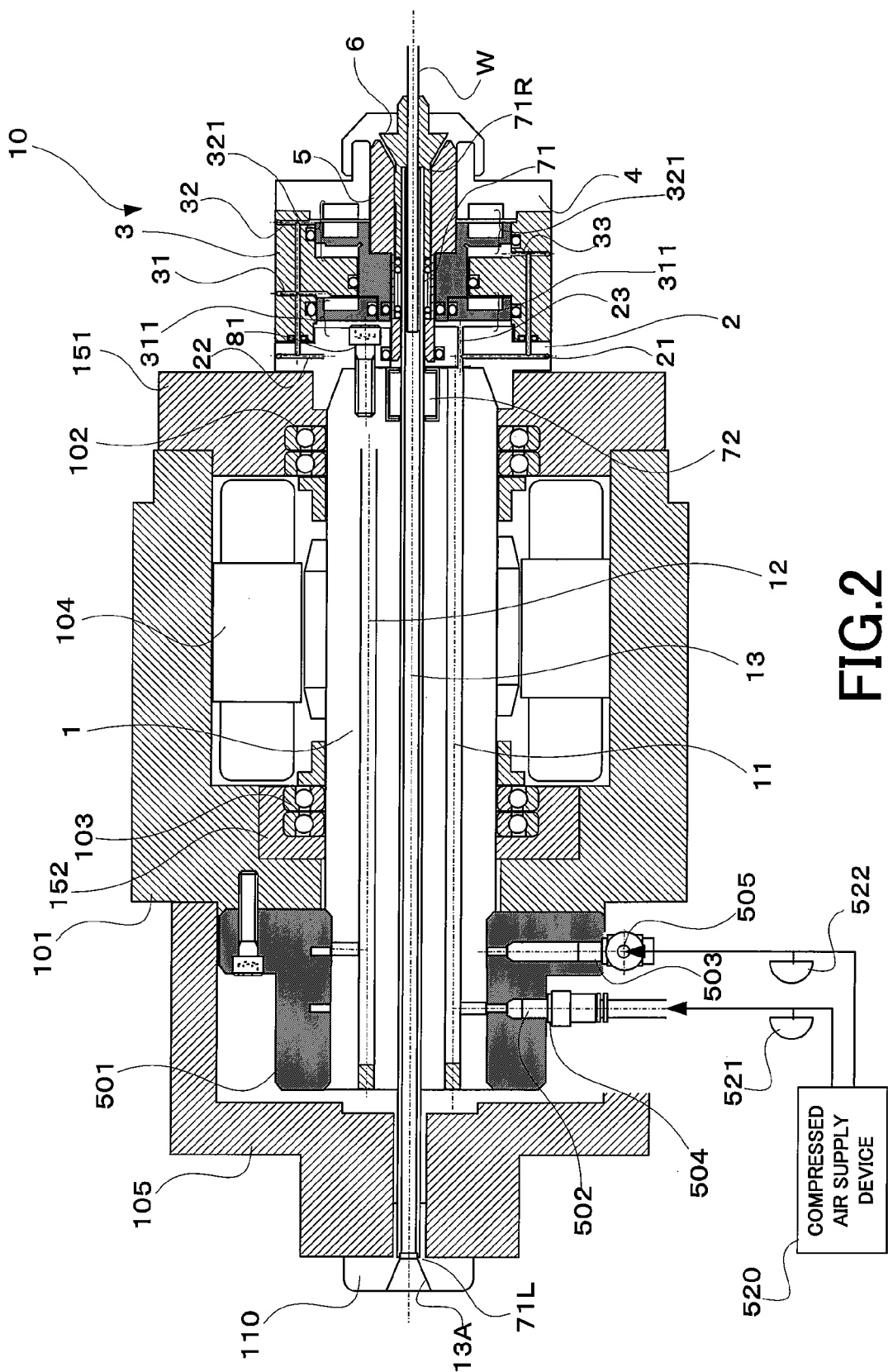
FIG. 2 is a cross-sectional view showing the main spindle device according to one embodiment of the present invention.

FIG. 2 is a cross sectional view of the main spindle device of the present invention according to one embodiment. The main spindle device according to the present embodiment comprises a main spindle 1 in the center, and various other elements to be described later. The main spindle 1 has a generally cylindrical shape as shown in FIG. 2. The main spindle 1 has compressed air flow paths 11 and 12 formed in its generally cylindrical body, along a direction in which the axial line of the main spindle 1 extends. The main spindle 1 also has a work feeding path 13 formed therein, likewise along the direction in which the axial line extends. Particularly, the work feeding path 13 is disposed to have its axial line extend just alike with the axial line of the main spindle 1. As obvious from the above, the compressed air flow paths 11 and 12, and the work feeding path 13 between them are formed inside the main spindle 1 in parallel with one another.

The main spindle 1 is rotatably supported by a first bearing 102 and a second bearing 103. The first bearing 102 and the second bearing 103 are held by a first bearing housing 151 and a second bearing housing 152 respectively. These first housing 151 and second housing 152 are held by the main housing 101.

The main spindle 1 is arranged to come snug with a cylindrical space defined by a stator of an electric motor 104. The main spindle 1 has a rotor, which is in pair with the stator. The main housing 101 has a space thereinside, in which the electric motor 104 is accommodated. The main spindle 1 is powered by the electric motor 104 and rotates about its axial line.

Hereafter, the structure at one end of the main spindle 1 on the left hand of the drawing will be explained first, and the structure at the other end of the main spindle 1 on the right hand of the drawing will be explained next.

At the one end of the main spindle 1 on the left hand of the drawing, there is provided a compressed air supply/discharge unit 501, which has a generally cylindrical hollow portion for storing the main spindle 1. Compressed air circulating ducts 502 and 503 are embedded in the compressed air supply/discharge unit 501. The compressed air circulating ducts 502 and 503 run through from the inner circumferential surface of the compressed air supply/discharge unit 501 to the outer circumferential surface of the compressed air supply/discharge unit 501.

The compressed air flow path 11 in the main spindle 1 is connected to the compressed air circulating duct 502 via a rotary joint integrated with the main spindle 1. The compressed air flow path 12 in the main spindle 1 is connected to the compressed air circulating duct 503 via the said rotary joint. A compressed air supply device 520 is connected to opening ports 504 and 505 of the respective compressed air circulating ducts 502 and 503. Pipes are connected between the compressed air supply device 520 and the opening ports 504 and 505. These pipes are provided with air pressure reducing valves 521 and 522.

Further, at the one end of the main spindle 1 on the left hand of the drawing, the sub housing 105 is provided so as to cover the compressed air supply/discharge unit 501 from the left hand of the drawing. The sub housing 105 is internally penetrated by a steady rest pipe 71, which is enclosed in the work feeding path 13 formed in the main spindle 1. The steady rest pipe 71 will be described in detail later. According to the present embodiment, the position of the very end of the compressed air supply/discharge unit 501 on the left hand of the drawing almost coincides with the position of the very end of the main spindle 1 on the left hand of the drawing.

The structure at the end of the main spindle 1 on the right hand of the drawing will now be explained. The chuck unit 10 is connected, via a flange 2, to the end of the main spindle 1 on the right hand of the drawing. The chuck unit 10 comprises a cylinder 3, pistons 311 and 321, a cylindrical member 4, a collet grasping member 5, a collet 6, etc.

As shown in FIG. 2, the flange 2 has a generally circular-discus shape. The flange 2 is connected, by a screw 81, to the end of the main spindle 1 on the right hand of the drawing, such that the axial line of the flange 2 coincides with the axial line of the main spindle 1. Compressed air relay paths 21 and 22 are formed inside the flange 2. The compressed air relay paths 21 and 22 do not link to each other. The compressed air relay path 21 is connected to the compressed air flow path 11 formed in the main spindle 1. The compressed air relay path 22 is connected to the compressed air flow path 12 (but the connected portion is not illustrated in the drawing).

The cylinder 3 is connected with the flange 2 as shown in FIG. 2. The appearance of the cylinder 3 is generally a circular cylinder. The cylinder 3 contains the pistons 311 and 321 thereinside. In-cylinder air flow paths 31 and 32 (see the upper side of the drawing) which are connected to the compressed air relay path 22, and an in-cylinder air flow path 33 (see the lower side of the drawing) which is connected to the compressed air relay path 21 are formed inside the cylinder wall that builds up the cylinder 3.

Figure 3:
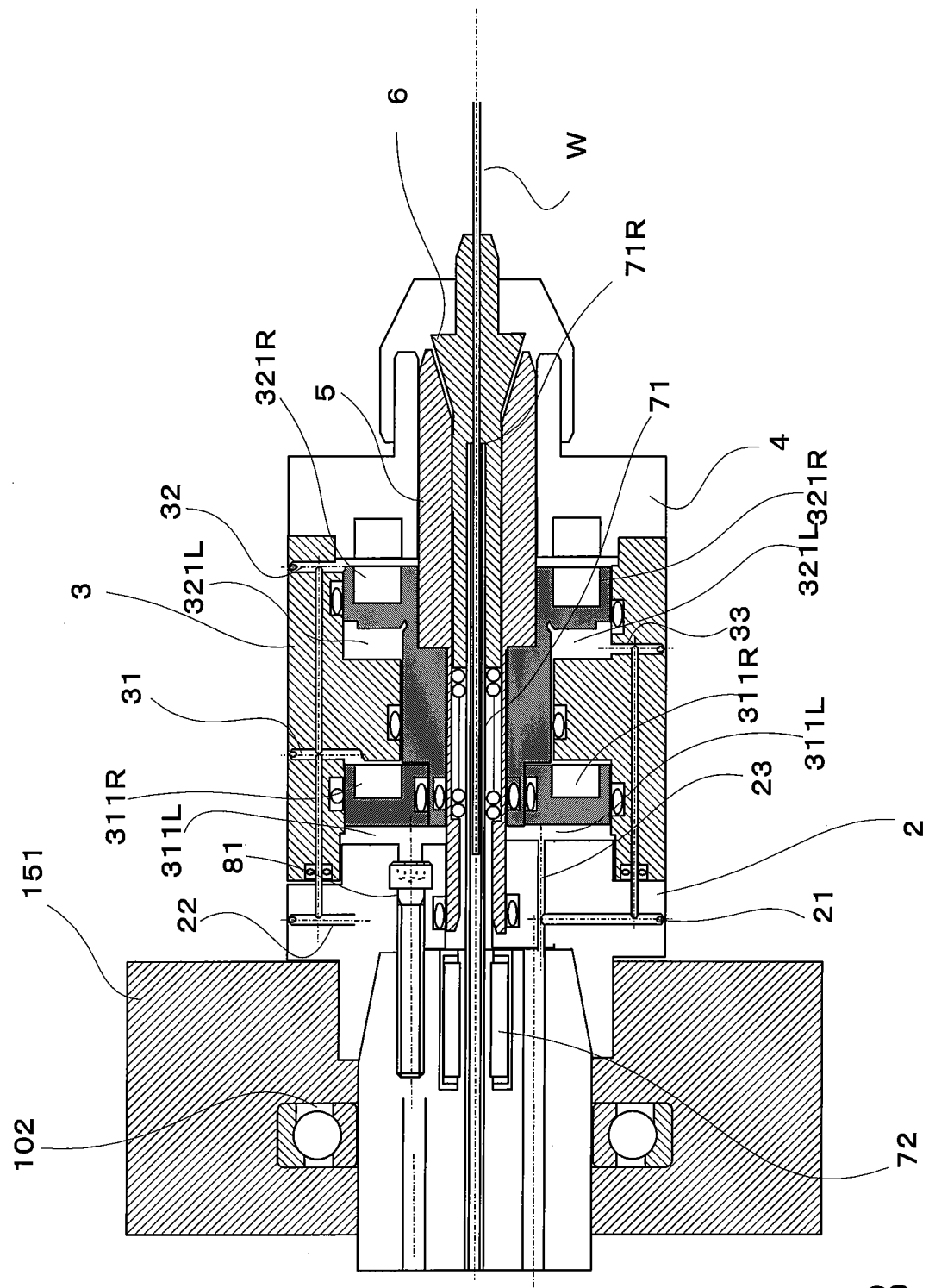
FIG. 3 is a cross-sectional view showing the main spindle device according to one embodiment of the present invention.

FIG. 3 shows an expanded cross sectional view of the right hand portion of the main spindle device according to one embodiment of the present invention. The in-cylinder air flow path 31 is connected to a space 311R which contacts one surface of the piston 311 on the right hand of the drawing. The in-cylinder air flow path 32 is connected to a space 321R which contacts one surface of the piston 321 on the right hand of the drawing.

The in-cylinder air flow path 33 is connected to a space 321L which contacts one surface of the piston 321 on the left hand of the drawing. A compressed air relay path 23, which links to the aforementioned compressed air relay path 21, is connected to a space 311L which contacts one surface of the piston 311 on the left hand of the drawing. The compressed air relay path 23 is formed inside the flange 2 likewise the other relay paths 21 and 22.

This structure enables compressed air to be supplied into the space at the side of the pistons 311 and 321 on the left or right hand of the drawing. According to which space is supplied with compressed air, the pistons 311 and 321 make a movement along a direction toward the left or right hand of the drawing.

In FIG. 3, compressed air is supplied into the spaces at the side of the pistons 311 and 321 on the left hand of the drawing. Therefore, the illustrated state shows the movement of the pistons 311 and 321 toward the right hand of the drawing.

At this time, the piston 311 and the piston 321 carry a portion that contact both of them as shown in FIG. 3 (see the stepped-down portion at an end surface of the piston 311 on the right hand of the drawing and at a side of the piston 321 on the left hand of the drawing). Therefore, the movement of one piston promotes the movement of the other. If, for example, air is supplied into the space 321R at the side of the piston 321 on the right hand of the drawing, the piston 321 moves to the left hand of the drawing. This movement of the piston 321 applies a force to the piston 311 to move to the left hand of the drawing.

In FIG. 2, the cylinder 3 is connected, at its end on the right hand of the drawing, with the cylindrical member 4 having a generally circular-cylindrical shape. The hollow opening of the cylindrical member 4 communicates with the work feeding path 13 in the main spindle 1. The collet grasping member 5 having a generally circular-cylindrical shape is attached fit inside this hollow opening. Then, the collet 6 is attached to the collet grasping member 5 as shown in FIG. 2. Further, the collet 6 grasps a work W.

The operation of the collet grasping member 5 is in conjunction with the operation of the pistons 311 and 321. That is, when the piston 311 or the piston 321 moves to the right hand of the drawing, the collet grasping member 5 moves to the right hand to operate in a closing direction. In response to this, a force acts on the collet 6 in a direction in which the collet 6 shrinks its diameter. The work W is thus grasped by the collet 6, or by the chuck unit 10 if seen in a wider view.

Reversely to the above, when the piston 311 or the piston 321 moves to the left hand of the drawing, the collet grasping member 5 moves to the left hand to operate in an opening direction. When the collet grasping member 5 operates in this manner, the collet 6 automatically expands its diameter by its own elasticity. Thereby, the work W is released from the collet 6, or from the chuck unit 10 if seen in a wider view.

The structures at both ends of the main spindle 1 on the left and right hands of the drawing have been explained. According to the present embodiment, the main spindle 1 is equipped with the steady rest pipe 71 from its one end to its other end. The steady rest pipe 71 is contained inside the work feeding path 13 in the main spindle 1.

A portion 71L at a very end of the steady rest pipe 71 on the left hand of FIG. 2 (hereinafter simply referred to as "leftmost portion 71L") is positioned at a farther left hand of FIG. 2 than the end of the main spindle 1 on the left hand of FIG. 2. That is, the steady rest pipe 71 projects from the leftmost end of the main spindle 1 and penetrates through a hole formed in the sub housing 105. The opening port of this hole of the sub housing 105 on the left hand of the drawing, where the hole contacts the outside, is covered with a sleeve 110. Thus, the leftmost portion 71L of the steady rest pipe 71 is also covered and supported by the sleeve 110. A work feeding port 13A formed in the sleeve 110 is connected to the hollow space in the steady rest pipe 71. An unillustrated bar feeder is provided at an end of the work feeding port 13A on the left hand of the drawing. The bar feeder feeds a bar-shaped work W into the work feeding port 13A. As known from this, the steady rest pipe 71 has a role as a guide hole for feeding the work W. Since the work W is fed through the hollow hole of the steady rest pipe 71, smooth feeding of the work W to the collet 6 is available. Further, since the work W is fed through the hollow hole of the steady rest pipe 71, there is no need for a particular feeding member for feeding the work W.

On the other hand, at the other end of the work feeding path 13 on the right hand of the drawing (i.e., at the rightmost end of the main spindle 1), a needle bearing 72 (needle roller bearing) is provided. The needle bearing 72 comprises an outer ring, a holding vessel for supporting the steady rest pipe 71, and a needle roller positioned between the outer ring and the holding vessel. The steady rest pipe 71 is rotatably supported by the needle bearing 72. A portion 71R at a very end of the steady rest pipe 71 on the right hand of the drawing (hereinafter simply referred to as "rightmost portion 71R") is positioned at a farther right hand of the drawing than where the needle bearing 72 is positioned. This position is close to a work grip portion of the collet to grip the work 6.

Next, the operation of the main spindle device having the above-described structure will be explained using FIG. 2.

First, the operation of the collet 6 to grasp a work W will be explained. In this case, since the collet grasping member 5 needs to be operated in the closing direction, the pistons 311 and 321 need to be moved to the right hand of the drawing. Accordingly, in this case, compressed air is supplied to the compressed air circulating duct 502 in the compressed air supply/discharge unit 501. Then, this compressed air flows first through the compressed air circulating duct 502, then the compressed air flow path 11, the compressed air relay paths 21 and 23, and the in-cylinder air flow path 33, and finally reaches the spaces 311L and 321L at a side of the pistons 311 and 321 on the left hand of the drawing. Thus, the pistons 311 and 321 move to the right hand of the drawing as pressured by the spaces at their side on the left hand of the drawing. Along with this movement of the pistons 311 and 321 to the right hand of the drawing, the collet grasping member 5 moves to the right hand of the drawing. Hence, the collet 6 is grasped by the collet grasping member 5 and the work W is grasped by the collet 6 at the same time.

The air pressure reducing valves 521 and 522 are provided on the pipes that extend from the compressed air supply device 520. By adjusting the pressure of the compressed air to be supplied with these air pressure reducing valves 521 and 522, it is possible to appropriately adjust the force for clamping the collet 6 or the work W.

The operation of the collet 6 to release the work W is opposite to the above. That is, in this case, compressed air is supplied to the compressed air circulating duct 503 in the compressed air supply/discharge unit 501. This compressed air flows through the compressed air circulating duct 503, the compressed air flow path 12, the compressed air relay path 22, and the in-cylinder air flow paths 31 and 32, and finally reaches the spaces 311R and 321R at a side of the pistons 311 and 321 on the right hand of the drawing. Under the pressure from the spaces at the side on the right hand of the drawing, the pistons 311 and 321 move to the left hand of the drawing. As the pistons 311 and 321 move to the left hand of the drawing, the collet grasping member 5 moves to the left hand of the drawing. Thereby, the collet 6 is released, and the work W is also released at the same time.

The main spindle device of the present embodiment having the above-described structure can achieve the following effects.

First, the main spindle 1 can be rotated at a high speed. This is because the mechanism that is involved in the rotation of the main spindle 1 is constituted by elements that have basically a circular-cylindrical shape or a circular discus shape. Further, because no load is imposed on the bearing both in a clamping state and an unclamping state, high speed rotation is available under both of these states. Meanwhile, according to the toggle method, even if the toggles are disposed at equal intervals along a circular circumference, the main spindle is difficult to rotate at a high speed, because of uneven weight distribution caused around the main spindle. Further, since the toggles tremble even in the unclamping state, their balance is hard to maintain and high speed rotation is all the same hard to achieve. High speed rotation is difficult to achieve even by the coned disc spring method, because no coned disk spring is provided in the close vicinity of the collet so that imbalance will be caused. Compared with the toggle method and the coned disc spring method, the main spindle device according to the present embodiment is very advantageous.

Second, according to the main spindle device of the present embodiment, the cylinder 3 and the pistons 311 and 321 which constitute the structure for grasping the collet 6 exist near the collet 6 (as shown in FIG. 2, the cylinder 3, the pistons 311 and 321, the collet grasping member 5, the collet 6, etc. are all arranged at one end of the main spindle 1 on the right hand of the drawing collectively). This enables the device on the whole to be compacted. This effect becomes more apparent especially when the device is compared with a main spindle device of a toggle method or a coned disc spring method. That is, the toggle method requires members such as an air cylinder, a lever to be connected to the air cylinder, etc., which are attached in the so-called add-on manner, making it hard to compact the device. The coned disc spring method requires the coned disc springs to be relatively long, making size reduction difficult. As compared with this, the present embodiment is extremely advantageous.

The existence of the cylinder 3 and the pistons 311 and 321 near the collet 6 means that power transmission is efficient. In this regard too, the present embodiment achieves an effect unique to itself.

Third, according to the main spindle device of the present embodiment, the clamping force of the collet 6 or on the work W can be finely adjusted. This is because the pressured fluid supplied from the compressed air supply device 520 makes it possible to finely adjust the force to be applied to the collet 6 clamping the work W indefinitely stepwise. In this regard too, the present embodiment is extremely advantageous over the toggle method by which grasping of a thin-walled work is difficult, and advantageous over the coned disc spring method which cannot finely adjust the clamping force by adjustment of the number of coned disc springs, thus has difficulty in adjusting the urging force of the coned disc springs.

Fourth, the main spindle device according to the present embodiment, which is provided with the needle bearing 72 for supporting the steady rest pipe 71, can have the steady rest pipe 71 made relatively long. As a result, the end portion (in FIG. 2, the rightmost portion 71R at the very end on the right hand of the drawing) of the steady rest pipe 71 can be brought close to where the collet 6 grasps the work W. Accordingly, it is possible to very effectively prevent the work W from vibrating.

Particularly, according to the present embodiment, the steady rest pipe 71 is present so as to cover almost all the length of the collet grasping member 5, as shown in FIG. 2. Therefore, it is possible to suppress the collet grasping member 5 or the work W from vibrating.

With these effects, the main spindle device according to the present embodiment enables more precise and accurate machining. Further, as described above, the presence of the steady rest pipe 71, which prevents vibrating of the work W as much as possible and effectively suppresses vibration of the collet grasping member 5, makes a great contribution to realizing high speed rotation of the main spindle 1.

In addition, as the fifth effect, two pistons 311 and 321 are provided inside the cylinder 3 which constitutes the structure for grasping the collet 6. Therefore, the size of the piston's cross-sectional area where the force of compressed air is received is apparently larger than that of a case where there is only one piston. Hence, according to the present embodiment, the force to grasp the collet 6 can be increased.

Furthermore, with the two pistons 311 and 321, a sufficient clamping force is produced. Therefore, the outer diameter of the cylinder 3 can be reduced and the inertia of the entire chuck unit 10 can be reduced. This makes it possible to quicken the response speed of the main spindle 1 when the main spindle 1 is to be accelerated or decelerated, and makes it possible to rotate the main spindle 1 at a high speed. Needless to say, this also contributes to size reduction of the device on the whole.

The cylinder 3 may be made of a material having a small specific gravity such as aluminum alloy, etc. In this case, the response speed of the main spindle 1 when it is to be accelerated or decelerated can further be increased, and high speed rotation can further be facilitated. The cylinder 3 may also be made of titanium alloy. This enables the cylinder more light-weighed and durable. This also helps size reduction of the entire device.

Yet further, as the sixth effect, as explained with reference to FIG. 2, the main spindle device of the present embodiment has the compressed air flow paths 11 and 12 in the main spindle 1, comprises the compressed air supply/discharge unit 501, and has the main spindle 1 integrated with the rotary joint. Therefore, a so-called air tube, which has conventionally been used, is no longer necessary, which leads to simplification of the device structure and cost reduction.

The present invention is not limited to the above-described embodiment, but can be modified in various manners.

For example, according to the above-described embodiment, compressed air is the drive source for the pistons 311 and 321. However, any general pressured fluid may be used. This includes, for example, hydrodynamically driving the pistons 311 and 321.

There may be provided only one piston, as long as the pressure of the pressured fluid can be an appropriate value.

According to the above-described embodiment, the needle bearing 72 is used as a support unit for supporting the steady rest pipe 71 at one end of the main spindle 1. However, not limitative to this, the support unit for supporting the steady rest pipe 71 at one end of the main spindle 1 may be, for example, a ball bearing. Further, the support unit for supporting the steady rest pipe 71 at one end of the main spindle 1 may be a slide bearing.

This application is based on Japanese Patent Application No. 2006-291207 filed on Oct. 26, 2006 and including specification, claims, drawings and summary. The disclosure of the above Japanese Patent Application is incorporated herein by reference in its entirety.

INDUSTRIAL APPLICABILITY

This invention is available for the main spindle which makes a high speed rotation of the work. This invention is available for the main spindle which reduces the size of the device on the whole.

What is claimed is:

1. A main spindle device, comprising:

a main spindle having a first hollow hole, wherein the main spindle rotates about an axial line of the main spindle as a center of rotation;

a chuck unit having a second hollow hole, wherein a back end of the chuck unit is connected to a front end of the main spindle and a collet at a front end of the chuck unit grasps a bar-shaped work;

a pipe having a tubular shape and comprising an entrance end, into which the work is inserted, and an exit end, from which a front end of the work that has been inserted from the entrance end protrudes, wherein the pipe is inserted through the first hollow hole of the main spindle and into the second hollow hole of the chuck unit and grasped by the collet to thereby prevent the work from vibrating when rotated together with rotation of the main spindle a sleeve which supports the pipe at a back end side of the main spindle, such that an axial line of the pipe coincides with the axial line of the main spindle, that the entrance end of the pipe projects from a back end of the main spindle, that the exit end of the pipe projects from the front end of the main spindle and enters in the chuck unit, that the exit end of the pipe is positioned close to a place where the collet grasps the work, and that the pipe does not rotate;

a support unit which is provided within the first hollow hole at the front end of the main spindle and supports the pipe; and a first fluid path and a second fluid path, wherein the fluid paths are disposed in the main spindle, a first pressured fluid flows through the first fluid path and a second pressured fluid flows through the second fluid path, wherein the chuck unit comprises:

a cylinder which contains thereinside a first piston and a second piston which are arranged in a direction from the back end to the front end of the chuck unit, wherein the first piston moves toward the front end of the chuck unit by being applied with a first thrust force from the first pressured fluid supplied through the first fluid path and moves toward the back end of the chuck unit by being applied with a second thrust force from the second pressured fluid supplied through the second fluid path, and the second piston moves toward the front end of the chuck unit by being applied with a third thrust force from the first pressured fluid supplied through the first fluid path and moves toward the back end of the chuck unit by being applied with a fourth thrust force from the second pressured fluid supplied through the second fluid path;

the collet configured to grasp the work projecting from the exit end of the pipe when a diameter of the collet is shrunk; the collet has a tubular shape and a center hole through which the work passes; a first taper is formed on an outer circumferential surface of the collet; and the diameter of the collet is elastically expanded or shrunk by a force applied to the first taper; and a collet grasping member, wherein the collet grasping member has a tubular shape and a center hole, a second taper is formed on an inner circumferential surface of the collet grasping member, and the second taper is engageable with the first taper of the collet; when the first and second pistons move to the front end of the chuck unit, the collet grasping member abuts a part of the first and second pistons, moves toward the front end, and uses the second taper to push the first taper in order to shrink the diameter of the collet; and when the first and second pistons move to the back end of the chuck unit, the collet grasping member moves to the back end and separates the second taper from the first taper in order to expand the diameter of the collet;

wherein outer shapes of the cylinder, the first and second pistons, and the collet grasping member, facing a direction of the axial line of the main spindle, have a generally circular contour;

a center of the generally circular contour coincides with the axial line of the main spindle;

the second piston has a third hollow hole through which a part of a back of the collet grasping member extends; and the main spindle device further comprises a pressured fluid pressure adjuster which adjusts pressures of the pressured fluids to be supplied to the first and second pistons to adjust a force to grasp the work with the collet.

2. The main spindle device according to claim 1, wherein the cylinder is made of a material which contains aluminum.

3. The main spindle device according to claim 1, further comprising a pressured fluid generator which generates the pressured fluids and supplies the pressured fluids to the fluid paths.

* * * * *